C. E. SWARTZBAUGH.
FIRELESS COOKER OR THE LIKE.
APPLICATION FILED MAR. 1, 1913.

1,093,566.

Patented Apr. 14, 1914.

WITNESSES:
C. H. Bills.
E. E. Thomas.

INVENTOR.
Charles E. Swartzbaugh
By Owen & Owen,
His attys.

UNITED STATES PATENT OFFICE.

CHARLES E. SWARTZBAUGH, OF TOLEDO, OHIO, ASSIGNOR TO THE TOLEDO COOKER COMPANY, OF TOLEDO, OHIO, A CORPORATION OF OHIO.

FIRELESS COOKER OR THE LIKE.

1,093,566. Specification of Letters Patent. Patented Apr. 14, 1914.

Application filed March 1, 1913. Serial No. 751,468.

*To all whom it may concern:*

Be it known that I, CHARLES E. SWARTZBAUGH, a citizen of the United States, and a resident of Toledo, in the county of Lucas and State of Ohio, have invented a certain new and useful Fireless Cooker or the like; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

In the use of fireless cookers it is found that steam from the compartment or compartments thereof escapes therefrom around the cover edge, no matter how tightly it may be seated, and that the water of condensation from the escaping steam falls on the cover top to the damage not only of the varnish or other surface coating of the cover but also to the material of the cover itself. Numerous efforts have been made to overcome this objectionable feature, but so far as I am aware none has been successful.

The object of my invention is the provision, in combination with a fireless cooker or the like, of means, which is adapted to both permit an escape of steam from the cooker receptacle when a predetermined pressure is present therein and to effect a condensation of the steam in its passage from the receptacle to the atmosphere to prevent the injury to the external cooker surface which would otherwise be occasioned.

Figure 1:
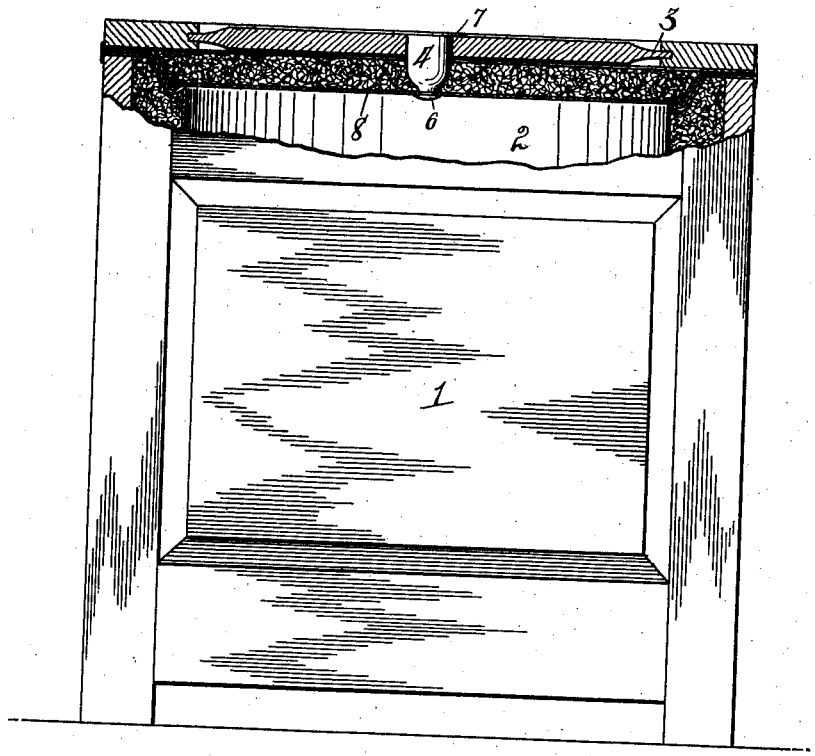
Figures 2, 3:
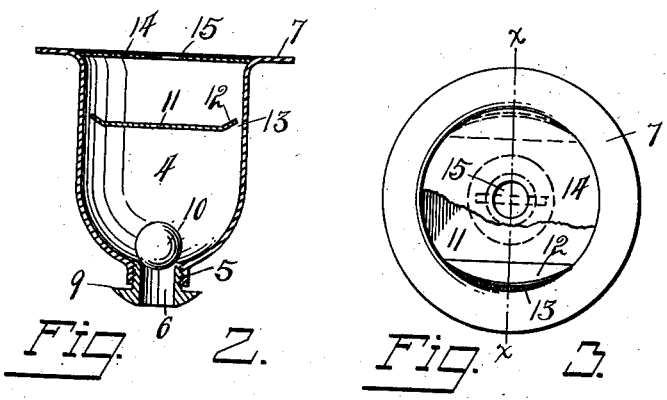

The invention is fully described in the following specification, and while, in its broader aspect, it is capable of embodiment in numerous forms, a preferred embodiment thereof is illustrated in the accompanying drawings, in which, Figure 1 is an elevation of a single compartment fireless cooker with the upper part thereof in central section. Fig. 2 is an enlarged central longitudinal section of the device embodying the invention taken on the line $x$, $x$ in Fig. 3, and Fig. 3 is an outer end view thereof with a part broken away.

Referring to the drawings, 1 designates a fireless cooker of any suitable size and construction, which is provided with a compartment 2, and has a cover 3 for seating closely over the top portion of the cooker to close the same.

Mounted preferably in the cover 3 is a cage 4, which is adapted to open communication between the compartment 2 and the atmosphere. This cage, which is preferably formed of sheet metal, is, in the present instance, contracted at its inner or lower end to form a restricted opening 5 into which a nipple 6 is threaded or otherwise suitably secured, and has its upper or outer end provided with a larger opening and outwardly flanged, as at 7, to adapt such flange to seat over the outer marginal edge of the cover opening in which the cage is disposed. The nipple 6 is intended to project through a registering opening in the inner sheet metal lining 8 of the cover and is provided at its outer or lower end with a radial flange 9 to adapt it to coöperate with the inner end edge of the cage 4 to grip the marginal edge of the lining opening through which the nipple projects. A gravity valve 10, preferably of the ball type, is disposed within the cage 4 and adapted to seat against the inner end of the nipple 6 to normally close the passage therethrough, and is unseated to permit an escape of steam or other fluid from within the compartment 2 when such steam has reached a predetermined pressure.

Disposed within the cage 4 intermediate its ends is a baffle disk or diaphragm 11 which closes the passage through the cage, except at opposite sides thereof, at which points the edges of the disk or diaphragm are laterally bent, as at 12, to provide narrow escape passages 13 between the edge of the diaphragm and the cage wall for the passage of steam therethrough. The free passage of steam through the cage 4 is further interrupted by the provision, in the outer end opening of the cage 4, of a disk or diaphragm 14, which closes such opening except for a small escape passage 15 in the center of the disk.

It is found in practice that the baffling of the steam in its passage through the cage 4 due to its contact with the disks 11 and 14 causes a condensation of the steam within the cage, thus preventing a dropping of moisture or water of condesation onto the cover top from the escaping steam. It is found in practice that the provision of a controlling and condensing means of this character for the steam very materially enhances the commercial value of fireless cookers or similar articles, and prevents the damaging of the external surface thereof by the dropping of water of condensation thereon.

I wish it understood that my invention is not limited to any specific construction or arrangement of the parts except in so far as such limitations are specified in the claim.

Having thus described my invention, what I claim as new, and desire to secure by Letters Patent, is,—

In a fireless cooker or the like, a cage mounted in the cover thereof and forming a passage therethrough, said cage having its inner end provided with a restricted opening and its outer end provided with an enlarged opening, a nipple threaded into said restricted opening, a ball valve seating against the inner end of said nipple to normally close the passage therethrough, a diaphragm disposed within the cage intermediate its ends and closing the passage therethrough except at opposite sides of the cage where restricted passages are provided, and a diaphragm closing the outer end of the cage and having a restricted centrally disposed opening therein.

In testimony whereof, I have hereunto signed my name to this specification in the presence of two subscribing witnesses.

CHARLES E. SWARTZBAUGH.

Witnesses:
 WILBER A. OWEN,
 S. T. KLOTZ.

Copies of this patent may be obtained for five cents each, by addressing the "Commissioner of Patents, Washington, D. C."